US006863633B2

(12) United States Patent
Misu

(10) Patent No.: US 6,863,633 B2
(45) Date of Patent: Mar. 8, 2005

(54) TORQUE TRANSMISSION DEVICE

(75) Inventor: Takahiro Misu, Nagoya (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/630,797

(22) Filed: Jul. 31, 2003

(65) Prior Publication Data
US 2004/0097316 A1 May 20, 2004

(30) Foreign Application Priority Data

Jul. 31, 2002 (JP) ........................................ 2002-222698

(51) Int. Cl.[7] .............................................. F16H 3/72
(52) U.S. Cl. ................................................... 475/5
(58) Field of Search .............................................. 475/5

(56) References Cited

U.S. PATENT DOCUMENTS 6,409,623 B1 * 6/2002 Hoshiya et al. ................ 475/5
6,524,217 B1 * 2/2003 Murakami et al. ............. 477/5

FOREIGN PATENT DOCUMENTS

JP 5-34541 B2 5/1993
JP 2001-105908 A 4/2001

* cited by examiner

Primary Examiner—Dirk Wright
(74) Attorney, Agent, or Firm—Burns, Doane, Swecker & Mathis, L.L.P.

(57) ABSTRACT

A torque transmission device includes an engine, a motor, an output shaft, and a planetary gear mechanism. The engine and the motor generate driving torque, and the output shaft outputs the driving torque. The planetary gear mechanism includes a first rotating element rotating together with the engine, a second rotating element connected to the motor, and a third rotating element connected to the motor. The torque transmission device further includes a primary clutch, a secondary clutch, a primary brake, and a secondary brake. The primary clutch selectively transmits rotation of the second rotating element to the output shaft, and the secondary clutch selectively transmits rotation of the third rotating element to the output shaft. The primary brake selectively stops the rotation of the third rotating element, and the secondary brake selectively stops the rotation of the second rotating element.

6 Claims, 3 Drawing Sheets

F I G. 2

| Range | Driving mode | | C1 | C2 | B1 | B2 |
|---|---|---|---|---|---|---|
| D | First-gear engine driving mode | | × | ● | × | ● |
| | ETC driving mode | | × | ● | × | × |
| | Second-gear engine driving mode | | ● | ● | × | × |
| | Motor driving mode | | ● | × | × | × |
| N, P | Neutral mode | Non-charging mode | × | × | × | × |
| | | Charging mode | ● | × | × | × |
| R | Reverse engine driving mode | | ● | × | ● | × |
| | Motor driving mode | | ● | × | ● | × |

Engaging element

● : Engaged   × : Released ically elastic. The output shaft

TORQUE TRANSMISSION DEVICE

CROSS REFERENCE TO RELATED APPLICATIONS

The application is based on and claims priority under 35 U.S.C. § 119 with respect to a Japanese Patent Application 2002-222698, filed on Jul. 31, 2002, the entire content of which is incorporated herein by reference.

FIELD OF THE INVENTION

This invention generally relates to a torque transmission device. More particularly, this invention pertains to a torque transmission device applied to an industrial vehicle such as a forklift truck having a relatively small number of shifts among hybrid vehicles including an engine and an electric motor.

BACKGROUND OF THE INVENTION

For example, a known torque transmission device is disclosed in a Japanese Patent Publication No.5 (1993)-34541. This torque transmission device has 2-speed forward gear and 1-speed reverse gear and applied to an industrial vehicle such as a forklift truck. FIG. 3 shows a schematic view of the above-described torque transmission device applied to the industrial truck. As shown in FIG. 3, driving torque from an engine (not shown) is transmitted to an input shaft through a torque converter. Then one gear as the driving torque is transmitted is determined among the 2-speed forward gear and the 1-speed reverse gear in response to combination of engaging and releasing at each clutch. The driving torque is finally transmitted to an axle through a differential gear, and then the axle is driven. In the torque transmission device shown in FIG. 3, since the torque converter is provided, the vehicle can smoothly start from halt condition.

In the industrial vehicle, stop-and-go movement is frequently repeated, and the vehicle mostly drives at low speed. Therefore, when the torque converter is applied to the industrial vehicle as shown in FIG. 3, it is difficult to improve fuel economy.

With a view to improving the fuel economy, a vehicle having no torque converter between an engine and a transmission and an electric motor as a drive unit, in which an engine-driven state and a motor-driven state are selectively switched depending on a driving state of the vehicle, that is, what we call a hybrid vehicle is disclosed in a Japanese Patent Laid-open Publication 2001-105908. In the hybrid vehicle, a continuously variable transmission is applied as a transmission. However, shift range of the continuously variable transmission is too wide for the industrial vehicle, and the size of a device is enlarged due to the continuously variable transmission.

Additionally, in the torque transmission device shown in FIG. 3, when the torque converter is removed and an electric motor is provided, it is difficult for the vehicle to start smoothly from the halt condition. Further, axial dimension of the torque transmission device is elongated.

The present invention therefore seeks to provide a torque transmission device with a compact body having adequate shift range to an industrial vehicle and capable of improving fuel economy.

SUMMARY OF THE INVENTION

According to an aspect of the present invention, a torque transmission device includes an engine; a motor, an output shaft, and a planetary gear mechanism. The engine and the motor generate driving torque, and the output shaft outputs the driving torque. The planetary gear mechanism includes a first rotating element rotating together with the engine, a second rotating element connected to the motor, and a third rotating element connected to the motor. The torque transmission device further includes a primary clutch, a secondary clutch, a primary brake, and a secondary brake. The primary clutch selectively transmits rotation of the second rotating element to the output shaft, and the secondary clutch selectively transmits rotation of the third rotating element to the output shaft. The primary brake selectively stops the rotation of the third rotating element, and the secondary brake selectively stops the rotation of the second rotating element.

According to another aspect of the present invention, the planetary gear mechanism is a double-pinion type planetary gear mechanism, the first rotating element corresponds to a sun gear, the second rotating element corresponds to a carrier supporting the two pinions, and the third rotating element corresponds to a ring gear.

BRIEF DESCRIPTION OF THE DRAWING FIGURES

The foregoing and additional features and characteristics of the present invention will become more apparent from the following detailed description considered with reference to the accompanying drawing figures wherein:

FIG. 2 shows a relationship between driving modes and engaging state of four frictional engaging elements at each range.

DETAILED DESCRIPTION OF THE INVENTION

Hereinafter, an embodiment of the present invention will be described with reference to FIGS. 1–2.

Figure 1:
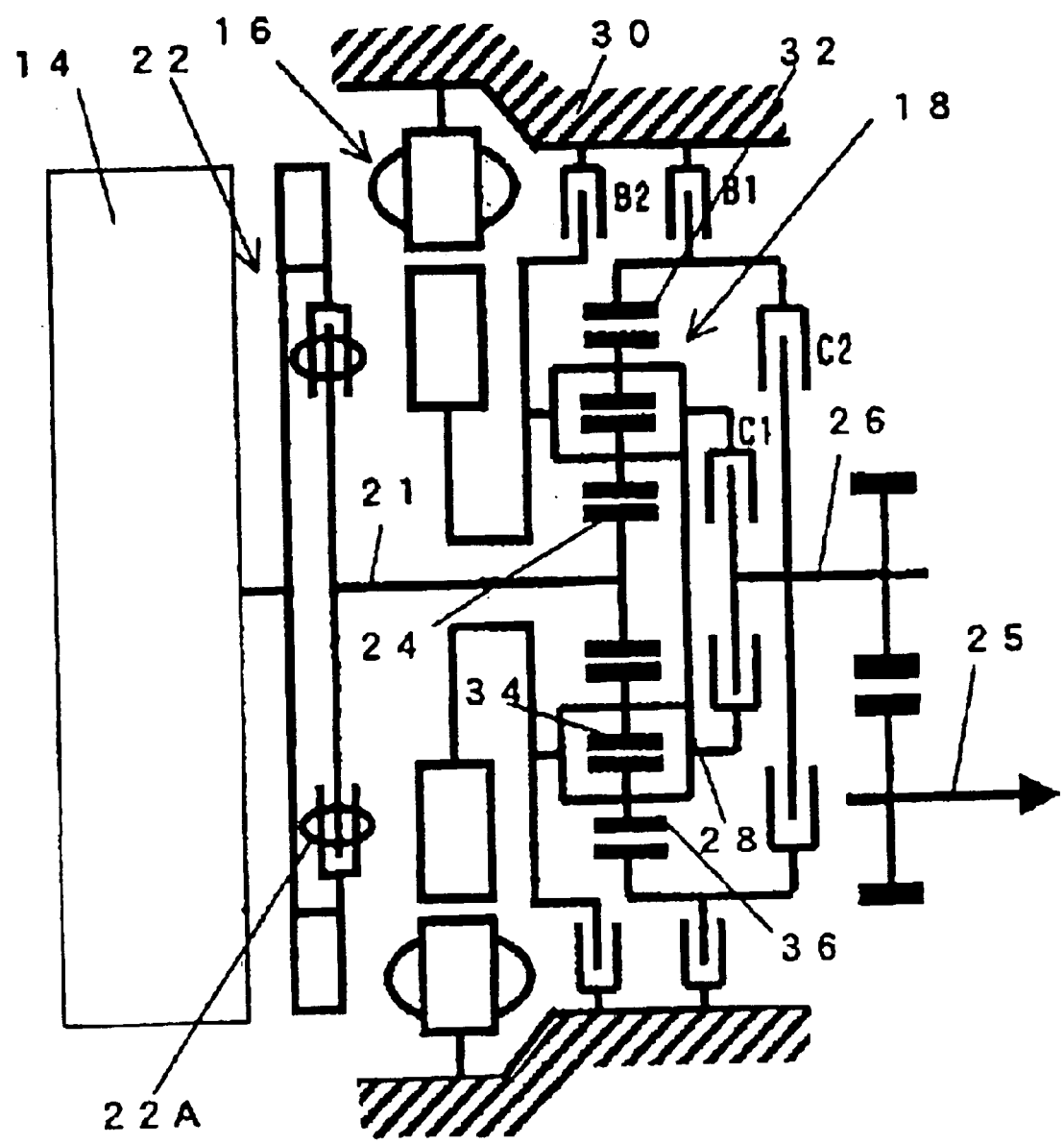
FIG. 1 is a schematic view of a torque transmission device according to an embodiment of the present invention.
Figure 3:
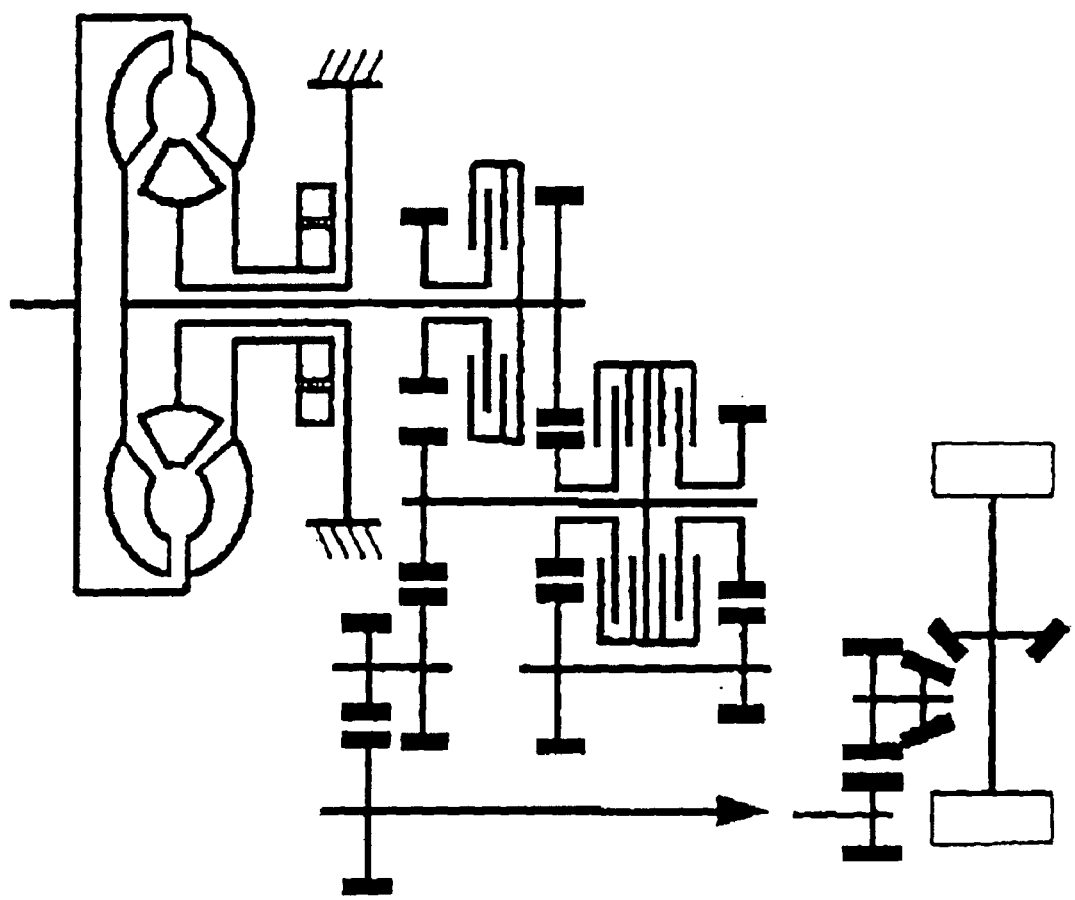
FIG. 3 is a schematic view of a known torque transmission device applied to an industrial vehicle.

FIG. 1 shows a schematic view of a torque transmission device according to an embodiment of the present invention. This torque transmission device is applied to an industrial vehicle such as a forklift truck among hybrid vehicles including an engine and an electric motor. The torque transmission device includes an engine 14 and an electric motor 16 as a drive unit. In the torque transmission device, driving torque generated by the engine 14 and the electric motor 16 is finally outputted to an axle (not shown) through an output shaft 26. The electric motor 16 is supplied with electric power by a battery (not shown) and selectively functions as a motor generator (hereinafter refereed to as a motor generator 16).

The torque transmission device includes an input shaft 21, the above-described output shaft 26, a damper 22, a double-pinion type planetary gear mechanism 18, and four frictional engaging elements (a primary clutch C1, a secondary clutch C2, a primary brake B1, and a secondary brake B2). The input shaft 21, the output shaft 26, the damper 22, the planetary gear mechanism 18, and the four friction engaging elements are concentrically accommodated in a housing 30.

The damper 22 is provided between the engine 14 and the input shaft 21. The damper 22 absorbs variation of rotational torque between the engine 14 and the input shaft 21 by a coil spring 22A which is peripherally elastic. The output shaft 26 engages with a counter shaft 25. The counter shaft 25 is connected to the axle through a differential gear (not shown).

The planetary gear mechanism 18 includes a sun gear 24 (a first rotating element), a carrier 28 (a second rotating element), and a ring gear 32 (a third rotating element). The sun gear 24 is integrally formed with the input shaft 21 and rotates together with the engine 14. The carrier 28 is connected to an output shaft of the motor generator 16 and rotatably supports a first pinion 34 and a second pinion 36 at each rotational axis.

Each frictional engaging element is, more specifically, a wet-type multiple disk clutch which is engaged and released in response to hydraulic pressure supplied from a hydraulic circuit (not shown). The primary clutch C1 transmits or shuts off the driving torque between the carrier 28 and the output shaft 26 in response to the hydraulic pressure from the hydraulic circuit, and the secondary clutch C2 transmits or shuts off the driving torque between the ring gear 32 and the output shaft 26 in response to the hydraulic pressure. The primary brake B1 fixes the ring gear 32 to the housing 30 or releases the ring gear 32 from the housing 30

In response to the hydraulic pressure, and the secondary brake 82 fixes the carrier 28 to the housing 30 or releases the carrier 28 from the housing 30 in response to the hydraulic pressure.

Next, operation of the torque transmission device will be explained below.

When the sun gear 24 rotates together with the engine 14, the carrier 28 rotates so that production of electricity generated by the motor generator 16 can gradually increase. That is, reactive force acting on the carrier 28, which corresponds to rotational driving torque of the motor generator 16, gradually increases as carrier 28 rotates, and then rotational speed of the ring gear 32 smoothly increases. Thus, the vehicle can be smoothly accelerated by the foregoing construction, which corresponds to an Electric Torque Converter (ETC).

When gear ratio ρ of the planetary gear mechanism 18, which is the number of teeth of the sun gear 24 divided by the number of teeth of the ring gear 32, is equal to "0.5", a relationship of rotational torque of the ring gear 32, rotational torque of the carrier 28, and rotational torque of the sun gear 24 is denoted in accordance with the following ratio in sequence; 1/ρ(1−ρ)/ρ1. Thus, the driving torque of the engine 14 is transmitted to the axle with the driving torque being amplified by 1/ρ being equal to "2". In the embodiment, the foregoing state is referred to as a torque amplifying mode.

FIG. 2 shows a relationship between driving modes and engaging state of the four frictional engaging elements at each range in the torque transmission device.

First, concerning the driving mode under the range of a shift lever (not shown) corresponding to drive (D) range, explanation will be provided. When the vehicle starts or drives at constant speed under relatively low load, a motor driving mode is selected, and the primary clutch C1 is engaged. In the motor driving mode, the vehicle drives by the driving torque of the motor generator 16. In this case, since direction of movement (forward/reverse) can be switched by switching of energizing direction at the motor generator 16, shift shock as the movement of direction is switched can be reduced as compared to an engine-driven case.

Thus, inching movement in which movement of the vehicle is subtly controlled can be easily performed.

Next, when the vehicle drives at low speed under relatively high load as compared to the foregoing case, a first-gear engine driving mode is selected, and the secondary clutch C2 and the secondary brake B2 are engaged. In this case, the driving torque of the engine 14 is decelerated under the gear ratio 1/ρ (=2), the vehicle drives at low speed by the driving torque of the engine 14.

When the vehicle drives at medium/high speed under relatively high load, a second-gear engine driving mode is selected, the primary clutch C1 and the secondary clutch C2 are engaged. In this case, the planetary gear mechanism 18 together rotates, the vehicle drives at medium/high speed by the driving torque of the engine 14 or by the driving torque of the engine 14 and the motor generator 16, or the motor generator 16 generates electric power as the vehicle drives by only the driving torque of the engine 14. An operating state of the motor generator 16 in the second-gear engine driving mode is arbitrarily switched in response to a driving state of the vehicle.

When the vehicle gradually accelerates from halt condition, an ETC driving mode, or the above-described torque amplifying mode is selected. In the ETC driving mode, only the secondary clutch C2 is engaged. In this case, the motor generator 16 is rotated so that the production of electricity (amount of regeneration), or reactive force of the rotational driving torque can gradually increase, and then the vehicle can smoothly start with predetermined revolution speed of the engine 14 being held.

When the range of the shift lever corresponds to neutral (N) range or parking (P) range under the halt condition of the vehicle, a neutral mode is selected. The neutral mode his a non-charging mode in which the motor generator 16 is not charged and a charging mode in which the motor generator 16 is charged by the driving torque of the engine 14. In the non-charging mode, all the frictional engaging elements are released, and then torque transmission through the planetary gear mechanism 18 is not performed. In the charging mode, only the primary brake B1 is engaged. The charging mode is selected when remaining amount of the battery is reduced below a predetermined level or when electric equipments are operated under the halt condition of the vehicle.

When the range of the shift lever corresponds to reverse (R) range, a reverse engine driving mode or the above-described motor driving mode is selected. The motor driving mode is selected only when the inching movement is performed, and the reverse engine driving mode is selected when the inching movement is not performed. In the reverse engine driving mode, the primary clutch C1 and the primary brake B1 are engaged, and the driving torque of the engine 14 is transmitted to the output shaft 26 through the planetary gear mechanism 18 with rotational direction being reversed. Then the driving torque is transmitted to the axle through the counter shaft 25.

Among the foregoing various driving modes, each driving mode is selected by a controller (not shown) in response to the driving state of the vehicle such as vehicle speed, depressing amount of an accelerator pedal, and a shift position.

As explained above, according to the present invention, since a planetary gear mechanism 18 is applied to a torque transmission device for a hybrid vehicle, when a vehicle drives by driving torque of an engine or when the vehicle performs inching movement by driving torque of a motor with load of the motor being controlled, smooth accelerating performance can be attained by shift characteristic of the planetary gear mechanism, and the torque transmission device having a compact body and capable of improving fuel economy can be provided.

The principles, preferred embodiments and mode of operation of the present invention have been described in the foregoing specification. However, the invention which is intended to be protected is not to be construed as limited to the particular embodiments disclosed. Further, the embodiments described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A torque transmission device, comprising:

an engine and a motor for generating driving torque;

an output shaft outputting the driving torque;

a planetary gear mechanism including a first rotating element rotating together with the engine, and a second rotating element connected to the motor, and a third rotating element a primary clutch selectively transmitting rotation of the second rotating element to the output shaft;

a secondary clutch selectively transmitting rotation of the third rotating element to the output shaft;

a primary brake selectively stopping the rotation of the third rotating element; and a secondary brake selectively stopping the rotation of the second rotating element.

2. A torque transmission device, according to claim 1, wherein the planetary gear mechanism, is a double-pinion type planetary gear mechanism the first rotating element corresponds to a sun gear, the second rotating element corresponds to a carrier, and the third rotating element corresponds to a ring gear.

3. A torque transmission device, according to claim 2, wherein a gear ratio between the sun gear and the ring gear of the planetary gear is equal to 0.5.

4. A torque transmission device, according to claim 2, wherein when a vehicle starts or drives at constant speed under relatively low load, a motor driving mode is selected, and the motor generates a driving torque on condition that the primary clutch is engaged.

5. A torque transmission device, according to claim 2, wherein the motor is a motor generator.

6. A torque transmission device, according to claim 5, wherein when a vehicle gradually accelerates from a halt condition, a torque amplifying mode is selected, and the motor generator is rotated so that the reactive force acting on the carrier is generated.

* * * * *